SR

XR 4,524,259

United States Patent [19]

Wolf et al.

[11] Patent Number: 4,524,259

[45] Date of Patent: Jun. 18, 1985

[54] PRINT HAMMER ASSEMBLY METHOD

[75] Inventors: Peter H. Wolf, Thousand Oaks; Thomas A. Dobson; Rafael Rozo, both of Canoga Park, all of Calif.

[73] Assignee: Dataproducts Corporation, Woodland Hills, Calif.

[21] Appl. No.: 481,651

[22] Filed: Apr. 4, 1983

[51] Int. Cl.$^{3}$ .................... B23P 1/08; B23K 26/00; B41J 9/127

[52] U.S. Cl. ........................ 219/69 R; 76/101 R; 101/93.48; 219/69 E; 219/85 BM; 219/121 LE

[58] Field of Search .................. 219/68, 69 R, 69 E, 219/69 V, 69 M, 85 R, 85 M, 85 F, 85 BA, 85 BM, 121 LC, 121 LD, 121 LE, 121 LF; 400/121; 101/93.04; 228/160, 162; 76/101 R, DIG. 5, DIG. 10; 29/602 R, 606; 101/93.05, 93.43, 93.48

[56] References Cited

U.S. PATENT DOCUMENTS

| | | | |
|---|---|---|---|
| 3,035,151 | 5/1962 | Welgarz | 219/69 E |
| 3,467,807 | 9/1969 | Livshits et al. | 219/69 V |
| 3,777,595 | 12/1973 | Hausermann et al. | 219/69 V |
| 3,941,051 | 3/1976 | Barrus et al. | 101/93.04 |
| 4,000,801 | 1/1977 | Baumeister et al. | 101/93.05 |
| 4,023,005 | 5/1977 | Bolin | 219/121 LD |
| 4,048,459 | 9/1977 | Earle | 219/85 BM |
| 4,102,268 | 7/1978 | Guarderas et al. | 101/93.04 |
| 4,186,527 | 2/1980 | Hausermann et al. | 219/69 V |
| 4,212,900 | 7/1980 | Serlin | 219/121 LF |
| 4,304,495 | 12/1981 | Wada et al. | 101/93.48 |
| 4,386,563 | 6/1983 | Farb | 101/93.48 |
| 4,387,287 | 6/1983 | Marazzi | 219/69 R |

OTHER PUBLICATIONS

*IBM Technical Disclosure Bulletin,* vol. 24, No. 11A, Apr. 1982, p. 5482 "Method for Making a Multiple Hammer Element" by Hanna et al.

IBM Technical Disclosure Bulletin, vol. 25, No. 8, Jan. 1983, p. 4376 "Sheet Metal Print Actuator" by Helinski.

IBM Technical Disclosure Bulletin, vol. 27, No. 2, Jul. 1984, p. 1099 "Print Hammer Mounting Arrangement For a Matrix Printer" by Lean et al.

*Primary Examiner*—Roy N. Envall, Jr.
*Assistant Examiner*—Geoffrey S. Evans
*Attorney, Agent, or Firm*—Spensley, Horn, Jubas & Lubitz

[57] ABSTRACT

The impact pins of a matrix printhead are brazed by a laser to a print hammer of the flat spring type. The print hammers are then attached to a printhead mounting block adjacent to each other with the impact pins in substantially a straight line. The attached print hammers are then shaped by an electric discharge machining (EDM) process by a single electrode to simultaneously machine the impact pins to the desired shape and to position the tips of the impact pins at a precise distance with respect to one another.

18 Claims, 8 Drawing Figures

Fig. 1
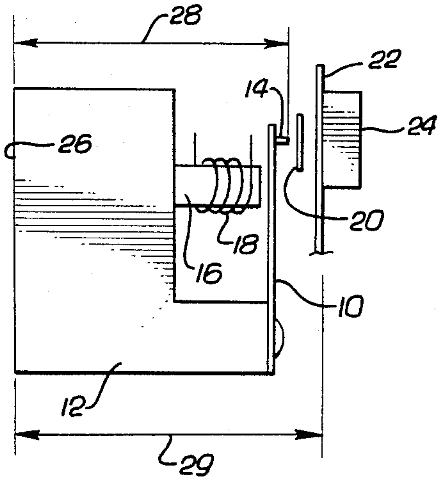
Fig. 2
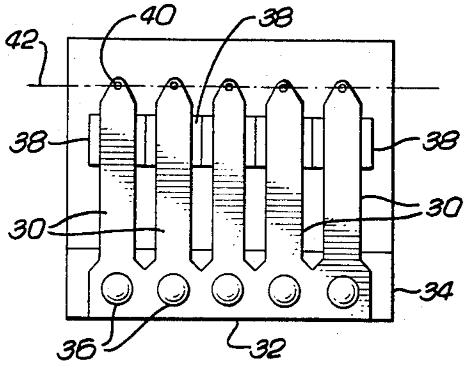
Fig. 3
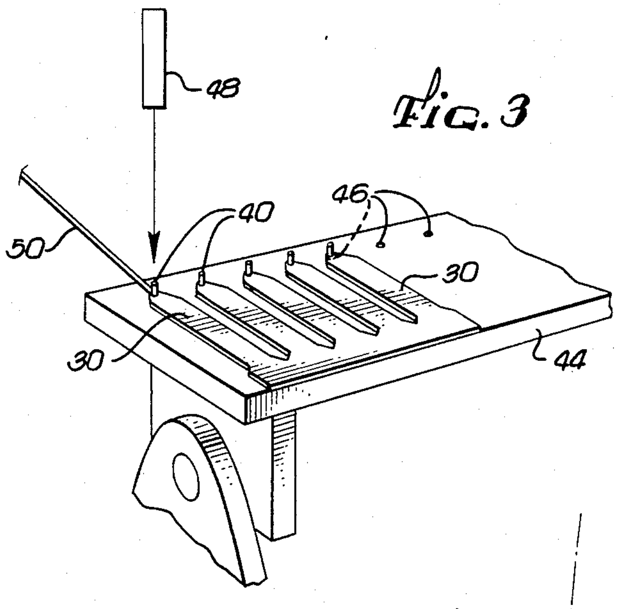
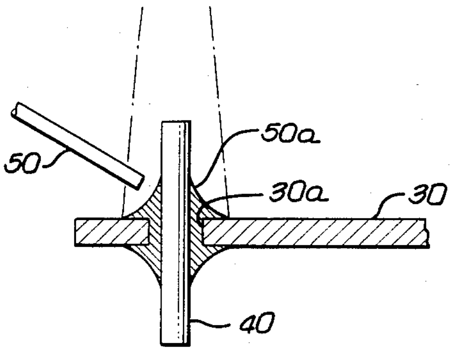
Fig. 4

PRINT HAMMER ASSEMBLY METHOD

BACKGROUND OF THE INVENTION

1. Field of the Invention

This invention relates to a method of manufacturing print hammers of the type employed in dot matrix printers. More particularly, the present invention relates to print hammers having an impact pin secured to a body. The body may be of the flat spring type. In printers employing such hammers, the spring is flexed to a stressed position by means of a permanent magnet and is released by applying a pulse to an electromagnet which overcomes the force of the permanent magnet. The spring will fly forward and the tip of the impact pin contacts an inked ribbon to cause a dot to be printed on a printing medium.

Typically, a number of flat spring print hammers (e.g., sixteen) are used in a print head. The print hammers are positioned so that the impact pins lie along a line and are spaced apart by a predetermined distance. In order to achieve high quality print, the impact tips must be precisely positioned with respect to one another. Errors in location of a few ten-thousandths of an inch can have a significant effect on print quality.

In addition to the requirement that the impact tips be precisely located with respect to each other, both the size of the impact tip (i.e., the diameter of the impact tip) and the distance of the impact tip from the mounting surface of the head (the surface where the head is mounted to the printer) are critical. The impact tip configuration is important to achieve the desired dot size. The distance from the impact tip to the mounting surface is important to ensure that a precise distance between the impact tip and the printing medium is maintained, thus providing the proper amount of printing energy for high print quality.

2. Description of the Prior Art

In prior art printers, the impact pin is machined or otherwise formed into the desired shape and then subsequently attached to the flat hammer spring by one of a variety of processes, such as resistance welding or press fitting. The tip of the impact pin is then ground to achieve a desired height with respect to the flat spring. Various hammer and impact pin configurations are disclosed in U.S. Pat. Nos. 3,941,051 to Barrus, et al. and 4,304,495 to Wada, et al. In both of these patents, the hammers are formed by initially forming the impact pin into its desired configuration and subsequently securing the impact pin to the flat spring. In order to achieve high print quality, the position of the impact pin on the spring must be precisely determined. In addition, the springs must then be mounted in the printhead assembly with extremely high precision in order to achieve the proper spacing between the impact pins of the various hammers. Since the impact tip is ground in relation to the spring, a precise relation must be maintained between the spring mount and the head mounting surface.

SUMMARY OF THE INVENTION

The present invention is directed to a method of forming a print hammer and a printhead in which the precision of positioning of the impact tips in the printhead is substantially improved. Initially, an impact pin having an impact tip which is larger than that desired is secured to each hammer element. The hammer elements either separately or in a fret are then attached to a printhead mounting block so that they are positioned adjacent to each other with the impact tips in substantially a straight line. The attached hammer elements are then subjected to a precision machining operation to shape the impact tips to the desired configuration. In the preferred embodiment, the machining operation is an electric discharge machining (EDM) process. The impact tips are simultaneously shaped by means of a single electrode. In addition to accurately shaping the impact tips, the machining process enables the impact tips to be positioned extremely precisely with respect to one another. Furthermore, the height of the impact tips with respect to the mounting surface printhead can be precisely controlled. Since the machining operation is performed after the hammer elements are secured to the mounting block, the attachment procedure is not critical. The invention thus provides both increased precision in impact tip positioning and simplifies the manufacturing procedure.

BRIEF DESCRIPTION OF THE DRAWINGS

The invention will now be described with reference to the accompanying drawings, wherein:

FIG. 1 is a diagramatic side plan view showing a portion of a printhead including a spring hammer;

FIG. 2 is a front view of a printhead showing a plurality of print hammers arranged so that their impact tips lie along a single line;

FIG. 3 is a perspective view of a fret of flat springs located on a fixture which is used during the process of attaching the impact pins to the springs;

FIG. 4 is a side plan view showing the detail of the pin attachment operation;

DESCRIPTION OF THE PREFERRED EMBODIMENT

Figure 5:
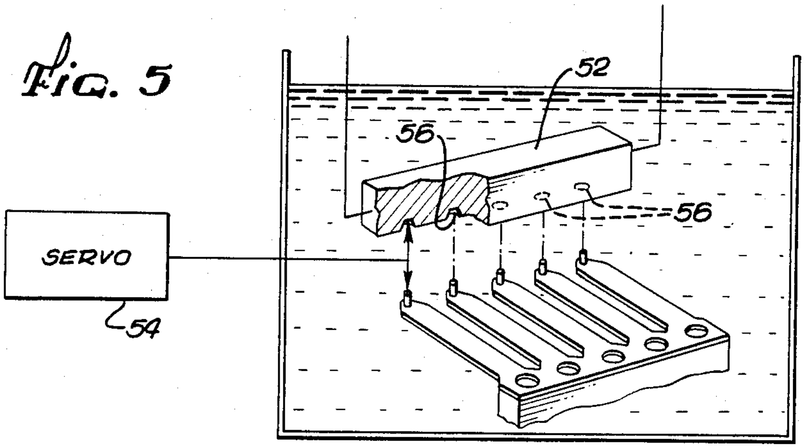
FIG. 5 is a perspective view showing the impact pins and an electrode which is employed in the tip shaping process.

The following description is of the best presently contemplated mode of carrying out the invention. This description is made for the purposes of illustration only, and is not to be taken in any limiting sense. The scope of the invention is best determined by the appended claims.

FIG. 1 shows the general construction of a matrix print hammer employing flat spring hammers. The printhead includes a flat spring hammer 10 which is typically made of steel and which is secured to a mounting block 12. The hammer has an impact pin 14 secured to the free end thereof.

The printhead shown in FIG. 1 is of the "stored energy" type. A permanent magnet 16 is secured to the mounting block 12 and attracts the flat spring 10 to place it under tension. When a dot is to be printed, a coil 18 is pulsed in order to create an electromagnetic field which counteracts the magnetic field of the permanent magnet to thereby release the spring hammer 10. The spring hammer 10 flies forward, striking an inked ribbon 20 and causing a dot to be imprinted on a printing medium 22. The printing medium 22 is backed by a platen 24.

In order to achieve optimum print quality, the flight distance to the printing medium (and thus print energy) must be precisely controlled. This is accomplished by ensuring that the distance between the impact tip of the impact pin 14 and the mounting surface 26 of the printhead, indicated by arrow 28, is within predetermined limits. This is so because the distance 29 from the mounting surface 26 to the platen 24 (and thus printing medium 22) when the printhead is mounted to the printer is a fixed machine parameter.

FIG. 2 is a front view of a portion of a matrix printhead which includes five print hammers 30. In the preferred embodiment, the print hammers are a part of an integral comb-shaped element 32 which is secured to a mounting block 34 by means of fasteners 36. Each spring hammer 30 has a magnetic pole face 38 in facing relation thereto. Each hammer 30 has an impact pin 40 attached thereto which is located along a line 42.

The printhead illustrated in the FIG. 2 is employed to print dots on a printing medium as it traverses the medium. The printing of the dots is controlled by electronic timing control circuitry. The operation of this circuitry is premised upon precise positioning of the impact tips 40 with respect to one another. If the impact tips 40 are not precisely positioned, the dots will not be printed at precisely the proper location and the print quality will thus be reduced, or electronic correction schemes must be employed. Preferably, the impact tips should have a precision of location of a few ten-thousandths of an inch.

In addition to accurately locating each impact tip, the angle of the tips in relation to the spring and the shape and size of the tips themselves are very critical. In a typical printhead, the desirable tip diameter is between 0.010 and 0.012 inches. If the impact tip is misshapen or of the wrong size, print quality will be reduced.

Thus, in order to achieve optimum print quality, the distance between the impact tip and the head mounting surface the size and shape of the impact tip, and the positioning of the impact tips with respect to each other must all be controlled to a high degree of precision. The manufacturing method of the present invention enables such precision to be achieved.

Referring to FIG. 3, the impact pins 40 are secured to the spring hammers 30 with the aid of a mounting fixture 44. Initially, each impact pin is placed in a supporting hole 46 (not visible) in the fixture 44. In the preferred embodiment of the invention, the impact pins are made of carbide to provide extremely high wear resistance. The impact pins have a diameter of approximately 0.022 inches. This is larger than the desired diameter of the impact tips. Because of this relatively large diameter, the pins are less prone to breakage than pins used in prior art assemblies.

The springs 30 are formed with through-holes at the impact pin location. After the impact pins 40 have been placed in the holes 46 of the fixture 44, the springs are placed over the pins in the fixture and flux is applied. The pins will extend through the through-holes beyond the top surface of the springs.

After the springs have been positioned with respect to the pins, a laser 48 is positioned directly over one of the pins. In the present embodiment of the invention, the laser is a YAG type having a power output of approximately eighty watts. After the spring has been heated, a brazing wire 50 is fed into the beam area. The beam melts the brazing wire to secure the pin to the spring hammer. The laser 48 is then moved over the next pin and the brazing operation is repeated. This operation is continued until each of the pins has been secured to its respective spring hammer.

The brazing process operates by the application of heat to the pin, spring hammer and brazing wire. In order to maintain the desired properties of the spring hammer, it is desirable to minimize the amount of.heat applied to the spring during the brazing operation. The laser 48 provides a highly focused beam which enables only the area around the opening 30*a* to be heated for the brazing operation. However, the heat will eventually be conducted to the remainder of the spring hammers, and it is therefore necessary to have some means of limiting the amount of heat applied. As shown in FIG. 4, once the brazing wire 50 begins to melt, it will flow and form a substantially cone shaped area 50*a* about the pin 40. In the present embodiment of the invention, the brazing wire which is used is a 0.015 inch diameter wire marketed by Handy Harman under the name Easy-Flo 45, the composition of which is 45% silver, 15% copper, 16% zinc and 24% cadmium. One advantage of this material is that it has a relatively low melting point thereby minimizing the amount of heat required. In addition, the brazing wire is a reflective material, and once it begins to melt it will reflect the laser beam. The reflection prevents any additional heat from being absorbed by the spring and the heating process is therefore self-limiting. Thus, the combination of the use of a laser to restrict the heat affected zone and the use of brazing material which will reflect the laser upon melting enables the brazing operation to be completed with the minimum amount of heat necessary. This serves to maintain the desired properties of the spring hammers. It should be noted that the disclosed brazing wire is illustrative only and that many different types of brazing materials may be successfully used.

Once the impact pins 40 have been secured to the spring hammers 30, the spring hammers are then attached to the mounting block 34 (FIG. 2). Although the spring hammers 30 are shown as being attached to the common member 32, it should be appreciated that individual spring hammers could also be employed.

Figure 6:
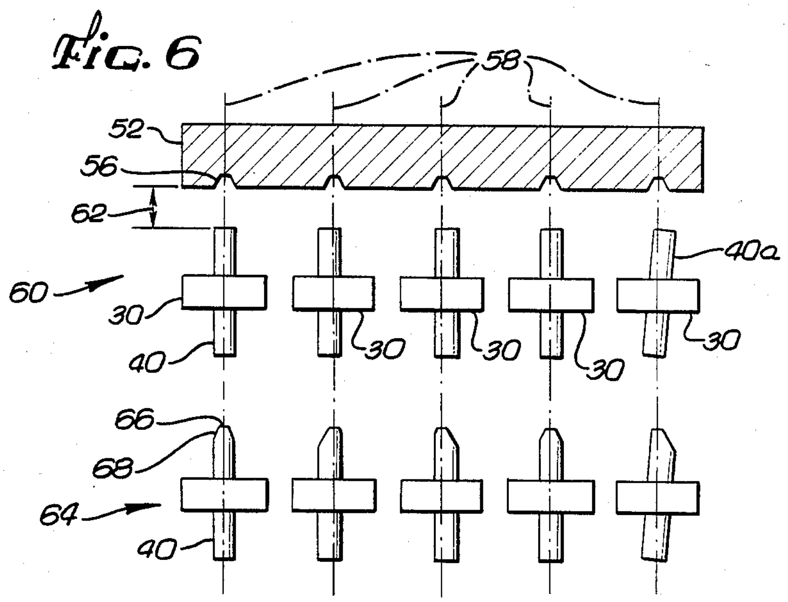
FIG. 6 is a plan view illustrating the manner in which the impact tips are shaped.

The diameter of the through-holes 30*a* is somewhat larger than the diameter of the impact pins 40, and the impact pins will therefore not necessarily be positioned precisely along a straight line as is desired. In addition, as discussed above, the diameter of the impact pins is greater than the desired diameter of the impact tips. In order to achieve the desired shape for the impact tips and the desired spacing between the tips, the pins are subjected to a shaping process. In the preferred embodiment of the invention, the shaping process employed is an electric discharge machining (EDM) process. As illustrated in FIG. 6, in this process an electrode 52 (which is copper in the present embodiment) and the assembled printhead module are submerged in precise position in a kerosene bath. For purposes of clarity only the hammers and a small portion of the mounting block are shown in FIG. 6. A servomechanism indicated generally at 54 is employed to move the electrode with respect to the mounting surface in the bath on which the module rests in order to precisely control the distance between the electrode and the mounting surface 26 (FIG. 1) of the module. The electrode 52 includes a plurality of recesses 56 equal to the number of tips to be shaped. These recesses are formed in a shape which corresponds to the desired shape of the impact tips. In the preferred embodiment of the invention, the recesses have a generally conical configuration. Each recess is precisely positioned with respect to the other recesses and is located in facing relation to an impact pin. The EDM process is then begun. This process basically involves the shaping of the impact tips by the generation of high voltage sparks from the electrode to the pins. The shape of the recesses 56 determines the final configuration of the impact tips. The EDM process is a well-known process and need not be described in further detail. It should be noted that during the EDM process, the electrode material is worn away, thus, altering the configuration of the recesses 56. Because of this, each electrode is used for only one EDM processing.

FIG. 6 illustrates the shaping accomplished by the EDM process. The desired spacing between the impact tips is indicated by center lines 58. However, when the spring hammers 30 are mounted on the mounting block 34, the impact pins will be out of alignment, as indicated at 60 in FIG. 6. The misalignment may be due either to lack of precision in securing the impact pins to the spring hammers or to lack of precision in mounting the spring hammers to the mounting block. In addition, since the through-holes 30*a* are larger than the diameter of the impact pins, some of the tips may not be precisely perpendicular to the surface of the spring hammer 30, as indicated at 40*a* in FIG. 6. Also, as previously discussed, the face of the impact pin is larger than that desired for the printer. In the EDM process, the electrode 52 is spaced by a predetermined distance from the impact pins by means of the servo 54. The recesses 56 are precisely spaced from each other so that they lie exactly upon the center lines 58. In the EDM processing, the impact pins 40 will be machined to form conically shaped impact tips as indicated at 64 in FIG. 6. The machining process results in impact tips 66 which are precisely centered with respect to the center lines 58. In addition, the impact tips 66 have the desired diameter (between 0.010 and 0.012 inches) for the printhead. Thus, although the impact pins themselves may not be precisely spaced with respect to each other, the impact tips which will actually impact the inked ribbon and form printed dots on the printing medium will be in precise alignment with respect to each other. Furthermore, the machining process will result in sloping surfaces 68, thus avoiding sharp edges at the impact tips and reducing the possibility of snagging on the inked ribbon. Finally, the impact tips will be positioned precisely at the desired distance with respect to the mounting surface of the printhead module.

Thus, by providing impact pins which are larger than those required and shaping the pins after they have been assembled on to the print head assembly, the spacing between the impact tips can be precisely controlled. The precision of the spacing is dependent upon the precision with which the recesses 56 can be formed. In contrast, in prior art systems the accuracy of the positioning is dependent upon the accuracy in attaching the impact pins to the hammers and in attaching the hammers to the printhead assembly.

It should be noted that although the brazing process has been described with reference to a straight (cylindrical) pin configuration, other configurations are within the scope of the invention. For example, a pin having multiple diameters in order to create a shoulder on the printing side of the pin could be used. Such a configuration would improve bonding by increasing surface area and supporting impact loads at the shoulder. The term "impact pin" as used in the present application is intended to cover any of the various configurations which could be employed.

Figure 7:
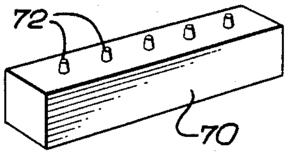
FIG. 7 is a perspective view of a tool which may be used to form the electrode used to shape the tips.
Figure 8:
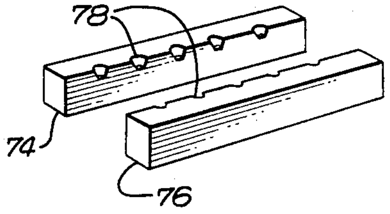
FIG. 8 is a perspective view of an electrode employing a two-piece configuration.

Several methods are available for forming the recesses in the electrode to the desired accuracy. In the preferred method, a punch 70 as illustrated in FIG. 7 is employed. This punch is formed of steel and is milled to form pins 72 which are identical in shape to the desired impact tip configuration. The punch 70 is then utilized to punch recesses into copper electrode material. A single punch can be employed to make a large number of electrodes.

In a second method, the electrodes are formed by employing two separate electrode elements 74 and 76. Each of these elements has grooves 78 formed in one surface thereof. Each groove corresponds to one half of the desired recess configuration. The electrode elements 74 and 76 are secured together with the grooves 78 in matching relationship so as to define the recesses.

Since the shape of the impact tips is determined by the shape of the recesses in the electrode, it should be appreciated that various impact tip configurations can be produced. Typically, a circular impact tip will be formed. However, other shapes such as square, hex or oval may also be produced. Some of these configurations may provide an improved appearance in the print out provided by the printer.

In summary, the present invention provides for extremely accurate positioning of the impact tips of hammer elements in a printhead. This is accomplished by shaping the impact tips after the impact pins have been secured to the printhead assembly. It should be noted that in the case where the hammer elements are formed as part of a comb-like structure, the impact tips could be formed prior to attaching the hammers to the printhead assembly. In such an instance, the desired alignment of the impact tips will be achieved since the spacing between the hammers will not be altered when they are mounted on the printhead assembly (although the distance from the impact tips to the mounting surface of the printhead module must then be separately controlled).

The invention also provides an improved method of securing the impact pins to the hammers. This involves the use of a laser beam to control a brazing operation. Upon melting the brazing material will reflect the laser beam and prevent any further heating of the hammer. It should be noted that although the brazing method described is preferable, it is certainly not mandatory. Other methods of bonding the pins to the hammers could be employed without affecting the ability to utilize the EDM shaping process to form the impact tips. In addition, although the preferred material for the impact tips is carbide, other materials could be utilized.

We claim:

1. A method of manufacturing a matrix printhead comprising the steps of:

providing a plurality of spaced apart elongated flat spring hammer elements;

securing an impact pin to each hammer element, wherein each impact pin has a tip which defines a dot to be printed and a tip configuration which is different from that desired for the printhead;

attaching the hammer elements to a printhead assembly; and subsequently shaping the impact pins so that they have the desired tip configuration and so that they are accurately spaced with respect to each other.

2. The method of claim 1 wherein the impact pins are simultaneously shaped by means of an electric discharge machining process.

3. The method of claim 1 wherein the step of securing is accomplished by brazing the impact pin to the hammer element.

4. The method of claim 3 wherein the brazing includes the steps of directing a laser beam toward the spring in the area of the pin to heat the spring and subsequently positioning a brazing material adjacent the impact pin to melt the brazing material.

5. The method of claim 4 wherein the brazing material reflects the laser beam, whereby when the brazing material melts and flows into the area surrounding the impact tip it will reflect the laser beam to thereby avoid further heating of the spring.

6. The method of claim 1 wherein the step of shaping includes the step of tapering the impact pin adjacent the impact tip to thereby avoid sharp edges at the impact tip.

7. The method of claim 1 wherein the impact pin is carbide and wherein the step of shaping is accomplished by an electric discharge machining process.

8. The method of claim 7 wherein the electric discharge machining process employs an electrode including a flat surface having a plurality of recesses formed therein which correspond to the desired configuration of the impact tips, wherein the machining process includes the steps of positioning the electrode a predetermined distance from a reference mounting surface of the printhead assembly and generating high voltage sparks between the electrode and the impact pins.

9. The method of claim 7 wherein the recesses have a generally conical configuration.

10. The method of claim 8 including the steps of providing a punch having a configuration corresponding to the desired configuration of the impact tips and punching the electrode with the punch to form the recesses.

11. The method of claim 8 wherein the electrode is formed by forming grooves in the surface of a pair of pieces of electrode material and securing the pieces together so that the grooves together define the recesses.

12. A method of manufacturing a print hammer assembly comprising the steps of:

providing a plurality of hammer body portions, each body portion having a hole formed therein;

inserting an elongated impact pin into each hole, wherein the impact pins have an impact tip having a cross-sectional configuration different from that desired for the print hammers of the assembly;

bonding each impact pin to its respective body portion;

securing the body portions to a hammer mounting assembly; and subsequently shaping the impact pins to provide the desired impact tip configuration and to provide the desired spacing between the impact tips.

13. The method of claim 12 wherein the step of bonding is accomplished by brazing the impact pins to the body portions.

14. The method of claim 13 wherein the step of shaping is accomplished by an electric discharge machining process in which the face of an electrode having a plurality of recesses formed therein is positioned a predetermined distance from a reference surface of the hammer mounting assembly with a recess located in facing relation to each impact pin, wherein machining is accomplished by generating electric discharges between the electrode and impact pins, wherein the recesses are spaced from each other by an amount necessary to achieve the desired spacing between impact tips.

15. The method of claim 14 wherein the recesses are generally conical in shape.

16. A method of manufacturing a printhead assembly comprising the steps of:

providing a plurality of hammer body portions, each body portion having a hole formed therein near a free end thereof;

inserting an elongated impact pin having an impact face into the hole in each body portion;

bonding each impact pin to its respective body portion;

attaching the body portions to a hammer mounting assembly adjacent to one another so that the impact pins lie substantially along a single line; and subsequently subjecting the impact pins to an electric discharge machining process to shape the pins into a predetermined configuration to thereby provide a hammer assembly in which the impact faces of the pins have the desired configuration and are precisely positioned with respect to each other.

17. The method of claim 16 wherein the machining process employs a single electrode having a plurality of recesses formed therein, wherein the configuration of each recess corresponds to the desired configuration of the impact tips and wherein the recesses are separated by an amount necessary to precisely achieve the desired spacing between impact tips.

18. A method of manufacturing a matrix printhead comprising the steps of:

providing a plurality of flat springs which are connected to a common member to form a comb-like structure;

securing an impact pin to each spring, wherein the tips of the pins define dots to be printed and have a configuration different from the desired impacting surface for the hammers;

subsequently shaping the impact pins to form impact tips having the desired configuration and spacing with respect to each other; and securing the comb-like structure to a printhead assembly.

* * * * *